US011884899B2

(12) United States Patent
Busch et al.

(10) Patent No.: US 11,884,899 B2
(45) **Date of Patent: *Jan. 30, 2024**

(54) METHODS OF LAUNDERING STITCHBONDED NONWOVEN TOWELS USING A SOIL RELEASE POLYMER

(71) Applicant: AMTEX INNOVATIONS LLC, West Chester, OH (US)

(72) Inventors: Robert Charles Busch, Covington, KY (US); Maxwell James Lee, Maineville, OH (US)

(73) Assignee: AMTEX INNOVATIONS LLC, West Chester, OH (US)

( * ) Notice: Subject to any disclaimer, the term of this patent is extended or adjusted under 35 U.S.C. 154(b) by 338 days.

This patent is subject to a terminal disclaimer.

(21) Appl. No.: 17/085,054

(22) Filed: Oct. 30, 2020

(65) Prior Publication Data

US 2021/0054312 A1 Feb. 25, 2021

Related U.S. Application Data

(63) Continuation-in-part of application No. 16/439,992, filed on Jun. 13, 2019, now Pat. No. 10,822,578, which is a continuation-in-part of application No. PCT/US2019/034915, filed on May 31, 2019.

(60) Provisional application No. 62/679,125, filed on Jun. 1, 2018.

(51) Int. Cl.

| | |
|---|---|
| ***C11D 11/00*** | (2006.01) |
| ***C11D 3/00*** | (2006.01) |
| ***C11D 3/395*** | (2006.01) |
| ***C11D 17/00*** | (2006.01) |
| ***C11D 1/00*** | (2006.01) |
| ***D06F 35/00*** | (2006.01) |

(52) U.S. Cl.

CPC ............ *C11D 11/0017* (2013.01); *C11D 1/00* (2013.01); *C11D 3/0036* (2013.01); *C11D 3/0047* (2013.01); *C11D 3/395* (2013.01); *C11D 11/0064* (2013.01); *C11D 17/0065* (2013.01); *D06F 35/006* (2013.01); *D10B 2331/04* (2013.01)

(58) Field of Classification Search

CPC ............ C11D 11/0017; C11D 11/0064; C11D 3/0036; C11D 3/0047; C11D 3/395; C11D 1/00; C11D 17/0065; D06F 35/006; D10B 2331/04

See application file for complete search history.

(56) References Cited

U.S. PATENT DOCUMENTS

| | | | | |
|---|---|---|---|---|
| 1,954,261 A * | 4/1934 | Pierce | D06F 33/06 137/340 |
| 3,332,882 A | 7/1967 | Blumbergs et al. | |
| 3,416,952 A | 12/1968 | McIntyre et al. | |
| 3,625,754 A | 12/1971 | Dunn | |
| 3,649,165 A | 3/1972 | Cotton | |
| 3,660,010 A | 5/1972 | Georgoudis et al. | |
| 3,676,052 A | 7/1972 | Harper et al. | |
| 3,702,231 A * | 11/1972 | Dale | D06M 15/267 8/186 |
| 3,782,898 A | 1/1974 | Mandell | |
| 3,950,277 A * | 4/1976 | Stewart | C11D 3/38627 510/320 |
| 3,981,807 A | 9/1976 | Raynolds | |
| 3,985,923 A | 10/1976 | Basadur | |
| 4,007,305 A | 2/1977 | Kakar et al. | |
| 4,014,857 A | 3/1977 | Schmoyer | |
| 4,018,646 A | 4/1977 | Ruffo et al. | |
| 4,068,035 A | 1/1978 | Violland et al. | |
| 4,073,993 A | 2/1978 | Lark | |
| 4,128,494 A | 12/1978 | Schirmann et al. | |

(Continued)

FOREIGN PATENT DOCUMENTS

| | | |
|---|---|---|
| CA | 989557 * | 5/1976 |
| EP | 0476193 A1 | 3/1992 |

(Continued)

OTHER PUBLICATIONS

Saeed Ajeli, Zoleykhah Ahmadvand, Investigation of the Two-Bar Warp-Knitted Fabric Structure Effect on Luster Value, Journal of Engineered Fibers and Fabrics, 2014, pp. 32-37, vol. 9, Issue 2, Isfahan, Iran. (6 pages).

International Search Report and Written Opinion dated Sep. 6, 2019 by the European Patent Office (as International Searching Authority), for related International Application No. PCT/U82019/034915, filed May 31, 2019 (12 pages).

International Preliminary Report on Patentability (Chapter I) dated Dec. 1, 2020 by the International Bureau of WIPO, for related International Application No. PCT/U82019/034915, filed May 31, 2019 (8 pages).

*Primary Examiner* — Amina S Khan

(74) *Attorney, Agent, or Firm* — Daniel F. Nesbitt; Nesbitt IP LLC

(57) ABSTRACT

A method of laundering a soiled stitchbonded nonwoven towel, to provide hygienically-clean, odor-free towels having non-durable soil release polymer agents on the fabrics and stitching is described. The method has a step of washing soiled stitchbonded nonwoven towels in a first aqueous wash solution formed from a first wash composition comprising a surfactant, a builder, an alkalinity source, and a soil release polymer, at a first alkaline pH, and at a first wash temperature sufficient to remove soil on the towels without redeposition of the soil back onto the towels or into the laundry machine once the residual wash solution is drained. The method also has a step of treating the washed towels in a treatment solution formed from a post-wash composition comprising a soil release polymer agent, at a temperature and pH sufficient to aid in exhausting soil release polymer from the treatment solution and onto the towels or fabrics.

14 Claims, 1 Drawing Sheet

(56) References Cited

U.S. PATENT DOCUMENTS

| | | | |
|---|---|---|---|
| 4,207,071 A | | 6/1980 | Lipowitz et al. |
| 4,290,765 A | | 9/1981 | Sandler |
| 4,427,557 A | | 1/1984 | Stockburger |
| 4,675,226 A | | 6/1987 | Ott |
| 4,704,321 A | | 11/1987 | Zafiroglu |
| 4,737,394 A | | 4/1988 | Zafiroglu |
| 4,740,326 A | | 4/1988 | Hortel et al. |
| 4,751,015 A | | 6/1988 | Humphreys et al. |
| 4,773,238 A | | 9/1988 | Zafiroglu |
| 4,818,426 A | | 4/1989 | Humphreys et al. |
| 4,876,128 A | | 10/1989 | Zafiroglu |
| 4,891,957 A | | 1/1990 | Strack et al. |
| 4,937,277 A | | 6/1990 | O'Lenick |
| 5,085,914 A | | 2/1992 | Perdelwitz, Jr. et al. |
| 5,098,764 A | | 3/1992 | Drelich et al. |
| 5,308,673 A | | 5/1994 | Tochacek et al. |
| 5,308,674 A | | 5/1994 | Zafiroglu |
| 5,789,365 A | * | 8/1998 | Blokzijl ............... C11D 3/0036 510/300 |
| 5,879,779 A | | 3/1999 | Zafiroglu |
| 5,895,623 A | | 4/1999 | Trokhan et al. |
| 5,902,757 A | | 5/1999 | Stern et al. |
| 6,200,351 B1 | | 3/2001 | Schlenig et al. |
| 6,381,817 B1 | | 5/2002 | Moody, III |
| 6,407,018 B1 | | 6/2002 | Zafiroglu |
| 6,516,502 B1 | | 2/2003 | Moody, III |
| 6,770,581 B1 | | 8/2004 | Demott et al. |
| 6,794,352 B2 | | 9/2004 | Svendsen |
| 6,821,601 B2 | | 11/2004 | Tsiarkezos et al. |
| 7,000,437 B2 | * | 2/2006 | Raney ..................... A47L 15/42 68/19 |
| 7,012,033 B2 | | 3/2006 | Hayes et al. |
| 7,112,621 B2 | | 9/2006 | Rohrbaugh et al. |
| 8,148,279 B2 | | 4/2012 | Anantharamaiah et al. |
| 8,900,328 B2 | | 12/2014 | De Buzzaccarini et al. |
| 9,394,637 B2 | | 7/2016 | Knowlson et al. |
| 9,433,154 B2 | | 9/2016 | Benim et al. |
| 9,770,153 B2 | | 9/2017 | Sears |
| 9,828,571 B2 | | 11/2017 | Britton |
| 9,890,350 B2 | | 2/2018 | Lundberg et al. |
| 10,822,578 B2 | * | 11/2020 | Busch ................. C11D 11/0017 |
| 2004/0224133 A1 | | 11/2004 | Pourdeyhimi et al. |
| 2005/0069672 A1 | | 3/2005 | Katsin |
| 2005/0112975 A1 | | 5/2005 | McMurray |
| 2007/0270071 A1 | | 11/2007 | Greer et al. |
| 2008/0166520 A1 | | 7/2008 | Zafiroglu et al. |
| 2010/0203306 A1 | | 8/2010 | Fingal et al. |
| 2011/0146017 A1 | | 6/2011 | Wildeman |
| 2011/0177296 A1 | | 7/2011 | Maranghi |
| 2013/0273297 A1 | | 10/2013 | Zafiroglu |
| 2014/0170402 A1 | | 6/2014 | Knowlson et al. |
| 2016/0168780 A1 | * | 6/2016 | Coggeshall .......... C11D 3/3956 8/108.1 |
| 2016/0228337 A1 | | 8/2016 | Knowlson et al. |
| 2017/0121650 A1 | | 5/2017 | Lundberg et al. |
| 2017/0203542 A1 | | 7/2017 | Ramaratnam et al. |
| 2017/0369819 A1 | * | 12/2017 | De Buzzaccarini ... C11D 3/395 |
| 2018/0251925 A1 | | 9/2018 | Knowlson et al. |
| 2018/0326699 A1 | | 11/2018 | Knowlson et al. |

FOREIGN PATENT DOCUMENTS

| | | | |
|---|---|---|---|
| EP | 0928583 | A2 | 7/1999 |
| WO | 9110719 | | 7/1991 |
| WO | 9419523 | A1 | 9/1994 |
| WO | 9630571 | A1 | 10/1996 |
| WO | 2010107640 | A1 | 9/2010 |
| WO | 2013077980 | A2 | 5/2013 |
| WO | 2014092806 | A1 | 6/2014 |
| WO | 2017124092 | A1 | 7/2017 |
| WO | 2018212904 | A1 | 11/2018 |
| WO | 2019069283 | A1 | 4/2019 |

* cited by examiner

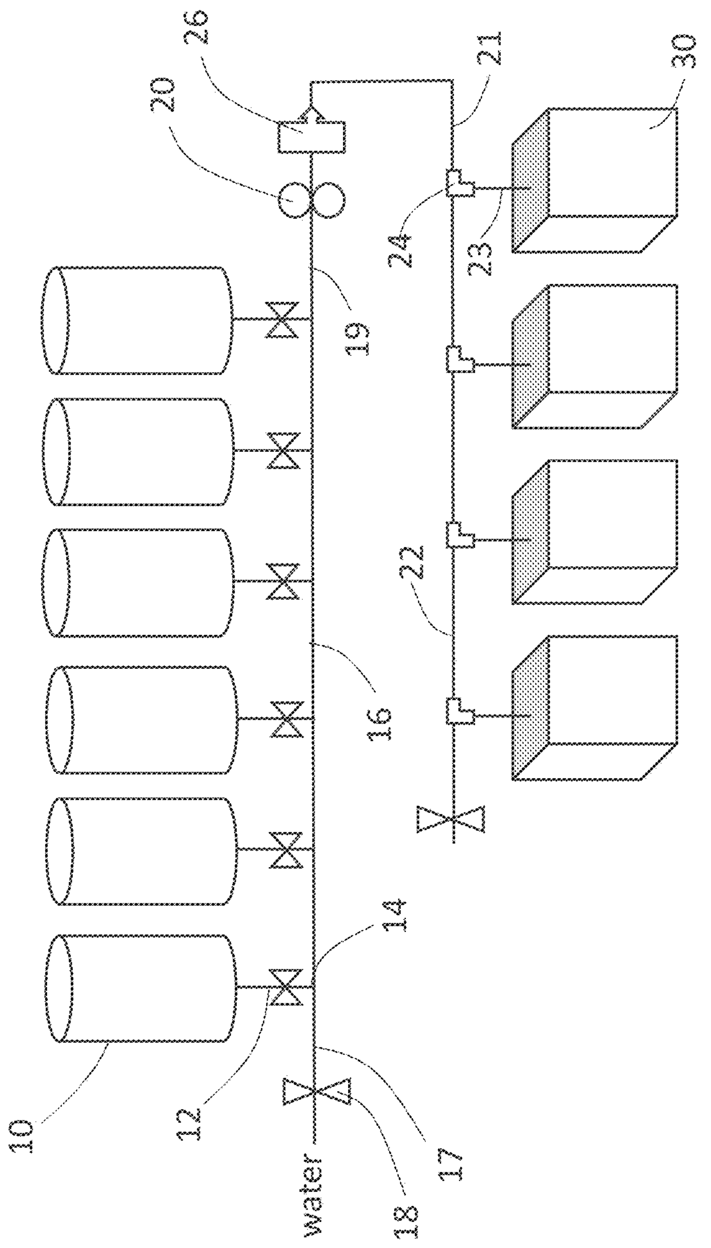
26
20
21
30
24
23
19
22
16
14
10
12
17
18
water

METHODS OF LAUNDERING STITCHBONDED NONWOVEN TOWELS USING A SOIL RELEASE POLYMER

CROSS-REFERENCE TO RELATED APPLICATIONS

This application is a continuation-in-part of U.S. application Ser. No. 16/439,992 filed Jun. 13, 2019, now U.S. Pat. No. 10,822,578, which is a continuation-in-part of International Patent Application PCT/US2019/34915, filed May 31, 2019, which claims the benefit of U.S. Provisional Application No. 62/679,125 filed on Jun. 1, 2018, which are incorporated herein by reference in their entireties.

FIELD OF THE INVENTION

The invention relates to methods of washing towels using soil release polymers in laundry methods.

BACKGROUND OF THE INVENTION

In the industrial laundry industry, hand towels, such as cotton towels, are laundered and rented to customers for the cleaning of kitchens, tables, walls, bar tops, and various other miscellaneous duties. The range of uses for the towels creates an environment where the product is subjected to much soiling and physical abuse. These towels are not ideal for all of these applications because of a lack of strength, propensity to lint, poor dimensional stability, and susceptibility to degradation from chlorine bleach. Degradation in the presence of chlorine is a particular problem with the longevity of the product because US DHEC (Department of Health and Environmental Control) regulations state that restaurants are required to soak their cleaning towels in a chlorine bleach solution for health reasons. Also, industrial laundries must bleach the towels heavily in the wash cycle to remove the tremendous loading of stains, oils, grease, and particulate from the towels. For these reasons, the towels have a very short life span and are not as durable as the laundries or restaurants would prefer. The wear and abuse the towels endure also cause tears and holes in the product which is not desirable to restaurants and other customers because they look dirty and worn in front of their clients and project a poor image for the company.

US Publication 2007/0270071, the disclosure of which is incorporated by reference, teaches a nonwoven fabric towel containing 25 to 75% by weight a polyester or polyester co-polymer staple fiber having a staple length of between 3 and 6 inches, and 25 to 50% by weight a multi-segment splitable staple fiber comprising a polyester or polyester co-polymer component and a polyamide component. The nonwoven fabric towel is bonded with stitches of a bulkable yarn. The polyester fibers, polyester co-polymer staple fibers, or the multi-segment splitable staple fibers, have a hydrophilic surface treatment on the surfaces, to effect some improvement water absorption of the nonwoven towel for sopping up spills.

Washing towels in an industrial setting has many challenges that are not typically encountered in most domestic and commercial settings. For example, in some industrial settings the cleaning towels are in contact with oils and grease in the food service industry. Accordingly, in certain industrial cleaning settings it is necessary to use more aggressive cleaning conditions as typical detergents, such as basic emulsion detergents, are not able to remove such oils and grease effectively.

One alternative method of dealing with oily and greasy stains that is commonly employed in commercial and domestic settings is the use of soil-release polymers (SRPs). SRPs are polymers that are able to bind to the fibers of towels and fabrics and prevent or reduce the amount of soils such as oil and grease from adhering to those fibers. SRPs can be effective at improving the removal of oily soils from synthetic fabrics in a laundry wash process. However, SRPs are not compatible with a typical industrial wash formula due to the highly alkaline main wash step-hydroxide-based alkaline step. Conventional SRPs possess a polyester backbone which is believed to be hydrolyzed in highly alkaline environments. In consumer laundry where the pH is generally near neutral, this is not an issue. But most industrial laundry uses a high alkaline step to help remove and suspend the industrial soils. Within the industry, it is typical to have a high alkaline prewash with hydroxide-based alkali, followed by detergent in a later step (see, for example, Riggs, Charles L. et al., "Bar Mops Formula," *Textile Laundering Technology* TSRA Handbook). Therefore, for use in industrial wash processes it would be desirable to use a high alkaline step and a soil release polymer in a way in which it is still effective. There have been attempts to remedy this problem, which have included, for example, in U.S. Pat. No. 6,200,351, the use of SRPs in a prewash step of an industrial laundering method. What the '351 patent did not anticipate is that if soil release polymers are used in a prewash step which contains a hydroxide-based alkaline source (caustic alkalinity), the most common alkali used within the industry, the polymers are completely ineffective.

Another alternative method includes methods of laundering including the use of a soil release polymer. In some embodiments, the soil release polymer can be included in a neutral to low alkalinity prewash or main wash that is substantially free of hydroxide-based alkalinity. In some embodiments, the soil release polymer can be included in a neutral to low alkalinity prewash that is substantially free of hydroxide-based alkalinity, followed by an alkaline main wash with any alkalinity source, as described in U.S. Pat. No. 9,890,350, the disclosure of which is incorporated by reference in its entirety. The method taught suggests that the soil release polymer would not survive a later alkali wash step or bleaching step, and would not be carried over into the laundered and dried towel.

Therefore, there exists a need for improved laundering and washing compositions that can provide the required high level of cleaning in industrial applications, and in particular in the use laundering of nonwoven and stitchbonded fabric towel. Further, there is a need to find additional viable cleaning methods for using SRPs in an industrial laundering setting.

SUMMARY OF THE INVENTION

The present invention provides a method of laundering a textile load comprising a plurality of soiled textile items, in a laundry machine (washing apparatus), and including an industrial laundry machine. The textile item comprises a woven, nonwoven or knit item. In one embodiment, the woven, nonwoven or knit item comprises polyester fibers, including a combination of polyester fibers with cellulosic fibers.

An embodiment of a textile item can include any one or more of a towel, a clothing fabric, a napkin, a hat, an apron, a shirt, gloves, and a pants, which include the woven, nonwoven and/or knit fabric or layer that comprises polyester fiber. The textile item can include all-polyester fabrics, as well as blends of polyester and cellulosic fibers, either within the same fabric layer or in integrated or composite fabric layers.

The soiling of various textile items can vary significantly depending upon the type of textile fabric and its environment during its wear or use. The extent of soiling of textile items in the food service and lodging industry, the automotive industry, and the oil and gas industry, including an industry where grease and oil stains are common, can be both severe and routine, and can be exemplified by towels, including woven and nonwoven towels, used in the food service industry. Without limiting whatsoever the scope and utility of the laundering methods described and claimed herein, the invention is described hereinafter in the context of stitchbonded and gathered nonwoven fabric towels.

In various embodiments, the textile item is a stitchbonded and gathered nonwoven fabric towels. In an embodiment, the towel item comprises one or more nonwoven layers, comprising cellulosic fibers and polyester fibers. A nonwoven layer can include an integrated composite of two nonwoven sublayers.

Another embodiment of the invention provides a system for providing for the use of clean, sanitized textile items, including nonwoven towels that include one or more nonwoven layers and contain both cellulosic fibers and polyester fibers, and for the laundering of the textile item after soiling in a laundering method using washing solutions, which sustain the cleanliness of the textile item through multiple soiling and laundering cycles.

In various embodiments, the laundering method comprises subjecting the stitchbonded nonwoven towel items to at least a first wash cycle, and can include an optional second wash cycle and a bleaching cycle.

In various embodiments, a level of non-durable soil release polymer can be provided in a washing solution, and preferably in the first washing solution, for suspending soils and stains released from the soiled towels and fabrics into the washing solution.

In various embodiments, the laundered and washed towel load is contacted during a high-temperature, acidic post-treatment with an aqueous treatment solution comprising a soil release polymer. The laundered and optionally bleached towels are post-treated with soil release polymer to deposit the soil release polymer onto the washed fabrics, including the fibers and fabric of the textile item, for example, a towel, and particularly the fabric layers and stitchbonding yarns of the textile items (e.g., towels), to provide soil staining protection to the laundered textile items (e.g., towels) during subsequent use and soiling.

The present invention can include a high-alkaline wash solution for improved soil and stain removal from the textile item or towel fabric. The high alkalinity of the wash solution can include hydroxide-based alkaline material. In various embodiments, the wash solution can comprise a two-phase wash solution, in which a first phase wash solution has a first pH level, and a second phase wash solution has a second pH level, typically a higher pH level than the first pH level, through the addition of a supplemental amount of an alkalinity agent into the first-phase wash solution.

The invention also optionally includes a high-temperature bleaching step in which the laundered towels are subjected to a chlorine bleaching at an elevated temperature to eliminate stubborn stains and to remove any residual soil release polymer. In various embodiments, the bleaching step can comprise a two-phase bleach solution, in which a first phase bleach solution has, or is initiated having, a first bleach agent active level in the solution, at a first temperature, and a second phase bleach solution has, or is initiated having, a second first bleach agent active level in the solution, through the addition of a supplemental amount of a bleach agent into the first-phase bleach solution. The first bleach agent active is typically, though not necessarily, the same as the second bleach agent active. The ratio of the content by weight of the first bleach agent active to the second bleach agent active is from 1:10 to 10.1, and can include about 1:4 to 4:1, about 1:3 to 3:1, about 1:2 to 2:1, and about 1:1.

In various embodiments, the textile items (e.g., towels), and particularly the stitchbonded nonwoven towel, is reused and resoiled multiple times, between each washing, bleaching and post-treatment wash cycle.

In various embodiments, the textile items (e.g., towels), when freshly manufactured has been subjected to a post-treatment of a hydrophilic soil release polymer (SRP) agent added into an agitated, heated aqueous solution that will help protect the freshly-manufactured towel from the re-deposition of soils in the first and early wash cycles onto the fibers and fabric of the stitchbonded washable towel. The post-treatment of the towel with the SRP agent helps resist staining and soil during the initial use and the early cycles of washing and re-use.

A first embodiment of the invention provides a method of laundering soiled textile items (e.g., towels), and particularly soiled stitchbonded nonwoven towels, to provide hygienically-clean, odor-free towels having a non-durable soil release polymer agents on the fabrics and stitching of the towels, using a first and a second separate wash cycles. The method comprises the steps of (i) optionally flushing the soiled towels with an alkali water solution for a time sufficient to loosen particular soiling on the fabric of the soiled towels; (ii) washing in a first wash cycle the soiled towels in a first aqueous wash solution formed from a first wash composition, the first wash composition comprising a surfactant, a builder, an alkalinity source, and optionally, though preferably, a soil release polymer, having, or having initially, a first alkaline pH, and at a first wash temperature; (iii) washing in a second wash cycle the first-washed towels in a second aqueous wash solution formed from a second wash composition, the second wash composition comprising a surfactant, a builder, and an alkalinity source having, or having initially, a second alkaline pH higher than the first alkaline pH, and at a second wash temperature; (iv) optionally, though preferably, washing in a bleaching wash cycle the washed towels, preferably the second-washed towels, in an aqueous bleach solution formed from a bleaching composition, the bleaching composition comprising one or more bleach compounds, the bleach compound selected from the group consisting of a halogen-based bleach, or an oxygen-based bleach, or a combination thereof, at a bleaching temperature; and (iv) treating in a post-wash treatment cycle the bleached towels in a treatment solution formed from a post-wash treatment composition, the post-wash treatment composition comprising a soil release polymer agent, preferably at an active level of about 0.03% to 3.0% by weight of the dry towel-sized fabric units, and at a treatment solution temperature between about 125 and 200 degrees F.

An alternative first embodiment of the invention can provide a method of laundering soiled towels or other soiled textile items or fabrics using only a first wash cycle, without a second wash cycle. In various embodiments, a first wash cycle may be used when the soil load on the soiled towels or other soiled textile items or fabrics is light or the intensity or tenacity of the stains in the soiled towel is low. In various embodiments, a first wash cycle may be used with a regular or heavy soil load on the soiled towels or other soiled fabrics by increasing one of more of the surfactant level and/or builder level in the wash solution, or the alkalinity (pH) and/or duration of the wash solution.

A second embodiment of the invention provides a method of laundering soiled towels, and particularly soiled stitch-bonded nonwoven towels, to provide hygienically-clean, odor-free or low-odor towels or other textile items having a non-durable soil release polymer agents on the fabrics and stitching of the towels or other textile items, using a wash cycle that includes a first phase and a second phase, conducted in series without draining the wash solution after the first phase. The first and second phases of the wash cycle employ different aqueous wash solutions, wherein the second aqueous wash solution comprises the composition of the first aqueous wash solution with the addition of a second alkalinity source. The method comprises the steps of (i) an optionally flushing the soiled towels with an alkali water solution for a time sufficient to loosen particular soiling on the fabric of the soiled towels; (ii) washing in a first phase of a wash cycle the soiled towels in a first aqueous wash solution formed from a first wash composition, the first wash composition comprising a surfactant, a builder, an alkalinity source, and a soil release polymer, at a first alkaline pH, and at a first wash temperature; (iii) adding a second alkalinity source to the first wash composition, to form a second aqueous wash solution having a second alkaline pH higher than the first alkaline pH; (iv) washing in a second phase of the wash cycle the first-phase washed towels in the second aqueous wash solution at a second wash temperature; (v) optionally, though preferably, washing in a bleaching wash cycle the two-phase washed towels in an aqueous bleach solution formed from a bleaching composition, the bleaching composition comprising one or more bleach compounds, the bleach compound selected from the group consisting of a halogen-based bleach, or an oxygen-based bleach, or a combination thereof, at a bleaching temperature; and (vi) treating in a post-wash treatment cycle the two-phase washed towels or bleached towels, in a treatment solution formed from a post-wash treatment composition, the post-wash treatment composition comprising a soil release polymer agent, preferably at an active level of about 0.03% to 3.0% by weight of the dry towel-sized fabric units, and at a treatment solution temperature between about 125 and 200 degrees F.

BRIEF DESCRIPTION OF THE DRAWINGS

The FIGURE illustrates a laundry ingredient dosing system for delivering chemical agents or ingredients to a laundry machine.

DETAILED DESCRIPTION OF THE INVENTION

Definitions

As used here, the terms "launder" and "laundering" may also be referred to as "wash" or "washing", or "clean of "cleaning".

As used here, the terms "wash" and "washing" when referring to compositions or process steps means a laundering solution that comprises a surfactant ingredient and a builder ingredient, or a bleach agent or ingredient, unless otherwise stated.

Nonwoven Towels

In a preferred embodiment of the invention described herein, the towel item comprises stitchbonded nonwoven towel item. In a non-limiting embodiment, the towel comprises a gathered nonwoven face sheet comprising a nonwoven layer of staple cellulosic fibers defining the technical face of the fabric, and the gathered nonwoven back sheet comprises a composite nonwoven sheet comprising an outer nonwoven sublayer of wood pulp fibers and an inner nonwoven sublayer of staple-length fibers that are heavily entangled and integrated with the wood pulp fibers of the outer nonwoven layer, with the inner nonwoven layer of staple-length fibers confronting the gathered nonwoven face sheet. The gathered component sheets comprising the nonwoven layer of staple cellulosic fibers and the composite nonwoven sheet are integrated together with the multiplicity of stitching yarn comprising the face-bar yarn on the technical face and the back-bar yarn on the technical back, to fix and gather the nonwoven face sheet to the nonwoven back sheet.

Non-limiting examples of stitchbonded nonwoven are described in US Patent Publication 2019/0315090, entitled "STITCHBONDED, WASHABLE NONWOVEN TOWELS AND METHOD FOR MAKING", the disclosure of which is incorporated by reference in its entirety.

Non-limiting examples of the staple cellulosic fibers defining the technical face of the fabric include can be selected from the group consisting of lyocell, rayon, and cotton, and other natural cellulosic materials, such as flax, hemp, jute, and ramie. In a further embodiment the cellulosic fibers are lyocell. Cotton and the other natural cellulosic fibers are provided in its natural staple form. The other cellulosic fibers, and particularly lyocell and rayon, can be in the form of textile-grade continuous filaments, or staple-length cut fiber, or a combination thereof.

In an embodiment of the invention, the composite nonwoven sheet comprises comprising a weight ratio of wood pulp fibers (in the outer sublayer) to textile fibers (in the inner sublayer) between about 1:3 to about 3:1 for example, a weight ratio of at least 1:2, for example, at least 1:1, and at least 2:1, and up to about 2.1, for example, up to about 1.1, and up to about 1:2. Typically, the content of the wood pulp fibers in the composite nonwoven sheet is about 25-75% by weight, and the content of the textile fibers, such as polyester, is about 25-75% by weight. In a preferred embodiment, the textile fibers of the inner sublayer of the composite nonwoven sheet comprise polyester fibers. In another embodiment, the textile fibers of the inner sublayer can also comprise lyocell fibers. In another embodiment, the textile fibers of the inner sublayer can also comprise polylactic acid (PLA) or nylon fibers. In another embodiment, the textile fibers of the inner sublayer comprise a combination of two or more of polyester fibers, lyocell fibers, nylon, and PLA fibers.

In a preferred embodiment, the staple cellulosic fibers of the nonwoven face sheet are mainly lyocell, and the staple-length fibers of the inner nonwoven sublayer are mainly polyester.

The stitching yarn can comprise one or more of a polyester yarn, a nylon yarn, a yarn of polylactic acid (PLA), a yarn of lyocell material, a yarn of other polymers, and a combination or mixture thereof. In selected embodiments at least one of the knitting bars uses textured bulkable yarns deployed under tension. These yarns relax in-sit within the stitched fabric, thereby developing spring-like crimp, and locking the stitches within the fabric. They furthermore tend to gather the fabric in one or two directions. The textured bulkable yarns can be used exclusively or in combination with hard yarns or elastomeric yarns or partially-oriented yarns.

In an embodiment of the invention, the front-bar yarn comprises nylon yarn, and the back-bar yarn comprises polyester yarn. Alternatively, the front-bar yarn comprises polyester yarn, and the back-bar yarn comprises nylon yarn. In another embodiment, the front-bar yarn and/or the back-bar yarn can comprise a partially-oriented or textured bulkable nylon yarn, and the back-bar yarn comprises a partially-oriented or textured bulkable polyester yarn. In an alternative embodiment, the front-bar yarn comprises a partially-oriented or textured bulkable polyester yarn, and the back-bar yarn comprises a partially-oriented or textured bulkable nylon yarn.

In a preferred embodiment, the towels are white or light-colored towels.

In various embodiments, the freshly manufactured towel is subjected to a post-treatment of a hydrophilic soil release polymer (SRP) agent added into the agitated, heated aqueous solution, that will help protect the freshly-manufactured towel from the re-deposition of soils in the first and early wash cycles onto the fibers and fabric of the stitchbonded washable towel. The post-treatment of the towel with the SRP agent helps resist staining and soil during the initial use and the early cycles of washing and re-use.

The laundering process or method described hereinafter refers to the laundering of towels, although the same steps and solutions apply as well to other textile items and fabrics.

Laundering Process

The present invention provides a laundering process or method, for laundering soiled textile items.

The laundry wash process is conducted in a laundry machine. In various embodiments, the laundry machine is an industrial laundry machine, typically supplied with a hot water inlet line and a cold water inlet line, and a drum or pocket into which the soiled fabrics or towels are placed and the wash-cycle solutions loaded. Non-limiting examples of an industrial laundry machine are models made by Milnor and Unimac, Brim (for example, models 78/42), Braun (for example, their Open Pocket models), Jensen-Ltron, and Ellis (for example, Open Pocket models). The hot and cold water are either fed directly into the laundry machine, or are mixed through a temperature-controlling valve to achieve a target temperature therebetween. In some laundering models, a heater can be provided to further raise the temperature above the supply temperature of the hot water supply. The laundry machine and the laundering process can be controlled to modulate the water usage level or quantity within each of the laundering cycles, including the flushes, washes, rinses, bleaches, sours, and post-treatment cycles.

The concentration of the active ingredients and agents in any of the laundering cycle solutions can be affected both by the quantity of the water into the laundry machine, including in the drum, pocket or any sump, and by the quantity of the laundering compositions added or dosed into the laundry machine.

A preliminary step in a laundering process is a flushing of the soiled towels with water to loosen and separate particulate soils from the towels. Soiled towels (and other fabrics) can be brought into the laundering facility with soils and stains on the fabrics, including solid and liquid stains carried in the folds and bound to the fabric and fibers of the towel material. A preliminary step, which may be an optional step in the process, is to load the soiled towels into a drum of a laundry machine and to add a sufficient amount of flush water, which can be warm water (in one example, 125-130 degrees F.), or hotter water or colder water, to soak the towels and loosen the particulate soils from the fabrics and into the flush solution, which is then drained away. The flushing of the soiled towels can be continued for a time sufficient to loosen particulate soiling on the fabric of the soiled towels. The time sufficient can be at least 2 minutes, and typically up to about 30 minutes, or even longer.

In an embodiment of the invention, the pH of the flush water can be alkaline, and typically in the range of at least pH 8.0, and up to a pH 11, which can include a pH range of 8.5 to 10.5, or 8.5 to 9.5, or 9.5 to 10.5, including a pH of about 9, or about 10. In various embodiments, the pH of the flush water can substantially remove any residual soil release polymer (SRP) on the soiled towels and can solubilize certain soil susceptible to alkali pH. Typically a pH of the flush water above about 11, and further above about 12, is avoided to preventing the setting of certain pH sensitive soils.

A first washing step includes a first washing cycle of the soiled towels with a first aqueous wash solution at a first temperature. The first aqueous wash solution comprises a first wash composition comprising a surfactant, a builder, and a soil release polymer, the first aqueous wash solution having a first alkaline pH, and a first wash temperature. The first wash composition can be in the form of a liquid, gel, powder, solid or particulate, and can be dosed or added into the first aqueous wash solution from a bulk source or as one or more individual dose forms. As used here, the terms "wash" and "washing" refer to compositions or process steps that employ a solution comprising at least a surfactant ingredient and a builder ingredient, or a bleach agent or ingredient.

The first wash composition can comprise by weight thereof at least 1% and up to about 40% of an active level of a surfactant Non-limiting examples of the active level of the surfactant in the first wash composition can include at least 5%, at least 8%, at least 10% and at least 12%, and up to 30%, up to 25% and up to 20%, and in the range of about 3% to 35%, of about 3% to 15%, of about 5% to 25%, of about 8% to 25%, and of about 10% to 35%. The surfactant can comprise a nonionic, anionic, cationic, amphoteric, or zwitterionic surfactant, or a mixture thereof as described in U.S. Pat. No. 9,890,350, the disclosure of which is incorporated by reference.

The first wash composition can comprise by weight thereof at least 2% and up to about 60% of an active level of a builder. Non-limiting examples of the active level of the builder in the first wash composition can include at least 5%, at least 10%, at least 15% and at least 20%, and up to 50%, up to 40% and up to 30%, and in the range of about 5% to 50%, of about 5% to 35%, of about 8% to 30%, of about 12% to 30%, and of about 10% to 50%. The builder can comprise a chelating agents or similar water conditioning agent. Chelation herein means the binding or complexation of a bi- or multidentate ligand. These ligands, which are often organic compounds, are called chelants, chelators, chelating agents, and/or water conditioning agent. Chelating agents form multiple bonds with a single metal ion. Chelants are chemicals that form soluble, complex molecules with certain metal ions, inactivating the ions so that they cannot normally react with other elements or ions to produce precipitates or scale. The ligand forms a chelate complex with the substrate. The term is reserved for complexes in which the metal ion is bound to two or more atoms of the chelant. The chelants for use in the present invention are those having crystal growth inhibition properties, i.e. those that interact with the small calcium and magnesium carbonate particles preventing them from aggregating into hard scale deposit. The particles repel each other and remain suspended in the water or form loose aggregates which may settle. These loose aggregates are easily rinse away and do not form a deposit.

Suitable chelating agents can be selected from the group consisting of amino carboxylates, amino phosphonates, polyfunctionally-substituted aromatic chelating agents and mixtures thereof. Preferred chelants for use herein are weak chelants such as the amino acids based chelants and preferably citrate, citrate, tararate, and glutamic-N,N diacetic acid and derivatives and/or phosphonate based chelants and preferably diethylenetriamine penta methylphosphonic acid. Other suitable chelants and builders are described in U.S. Pat. No. 9,890,350, the disclosure of which, including the prior art described therein, is incorporated by reference.

The soil release polymer can comprise any one or a combination of the soil release polymers described herein below. A portion of the soil release polymer in the first aqueous wash solution can exchange with the surface of the fabrics, though most of the soil release polymer remains in the solution as a dispersant of oily soils. A quantity of the soil release polymer can replace a quantity of the surfactant used in the first wash composition.

The first wash composition can comprise by weight thereof at least 1% and up to about 50% of an active level of an alkalinity source. Non-limiting examples of the active level of the alkalinity source in the first wash composition can include at least 5%, at least 10%, at least 15% and at least 20%, and up to 40%, up to 35% and up to 20%, and in the range of about 3% to 40%, of about 5% to 20%, of about 8% to 30%, of about 10% to 35%, and of about 12% to 40%. In an embodiment of the invention, the alkalinity source can be in the first wash cycle in an amount that provides a pH between about 8 and about 13. Non-limiting examples of the pH of the first wash composition can include at least pH 9, at least pH 10, or at least pH 11, and up to pH 12, or up to pH 11, and in the pH range of about 8 to 9 (8.5±0.5), about 9 to 10 (9.5±0.5), about 10 to 11 (10.5±0.5), about 11 to 12 (15±0.5), and about 12 to 13 (12.5±0.5); and preferably a pH in the range of about 9, or about 10, or about 11, or about 12. The final pH of the first wash cycle can include alkalinity carried over from the flushing cycle.

An amount of an alkali builder or chelant can be provided within the pH range. The alkalinity source can include hydroxide-based alkalinity sources. Thus, suitable alkalinity sources for use in the invention can include alkanol amines, carbonates, hydroxides, and silicates. In a preferred aspect of the invention, the alkalinity source is silicate-based. Suitable alkanolamines include triethanolamine, monoethanolamine, diethanolamine, and mixtures thereof. Suitable carbonates include alkali metal carbonates, such as sodium carbonate, potassium carbonate, bicarbonate, sesquicarbonate, and mixtures thereof. Suitable hydroxides include alkali and/or alkaline earth metal hydroxides. Preferably, a hydroxide-based alkalinity source is sodium hydroxide. In some embodiments of the invention, the entire method of laundering can be substantially free of hydroxide-based alkalinity sources. Suitable silicates include metasilicates, sesquisilicates, orthosilicates, and mixtures thereof. Preferably the silicates are alkali metal silicates. Most preferred alkali metal silicates comprise sodium or potassium.

The first wash cycle is provided to contact the towels with the first wash composition for time sufficient for the formulation to clean or remove soil on the towels during operation of the laundry machine without redeposition of the soil back onto the towels or into the laundry machine once the soil in residual wash solution is drained. Typically, the removed and suspended soils remain dissolved or suspended in the wash solution, and are drained out of the laundry machine with the drained wash solution. A time sufficient for the first wash cycle, or for a single wash cycle, can be at least 5 minutes, and up to about 1 hour, or even longer. Non-limiting examples of the time sufficient for the first wash cycle can include: at least 10 minutes, at least 15 minutes, at least 20 minutes, at least 25 minutes, and at least 30 minutes, and up to about 50 minutes, up to about 45 minutes; up to about 40 minutes, up to about 35 minutes, and up to about 30 minutes.

Typically, the temperature of the first wash solution, or for a single wash solution, can range between 125 and 180 degrees F., and typically at about 145 to 165 degrees F. Higher temperatures are preferably avoided to prevent substantial decomposition of the soil release polymer, and is also selected for the best performance of the surfactant. In one embodiment, the first aqueous wash solution has a pH between about 8 and 10, and a temperature in a range between 125-155 degree F., sufficient to avoid substantial decomposition of the soil release polymer in the first aqueous wash solution. In another embodiment, the first aqueous wash solution has a pH between about 12 and 13, and a temperature in a range between about 165-180 degree F.

Non-limiting examples of the time sufficient for the first wash cycle can include: at least 5 minutes, at least 10 minutes, and up to about 20 minutes, and up to about 15 minutes.

After the first washing cycle, the residual wash solution can be drained away, and one or more optional water rinses of the first-wash towels can be performed.

A second washing step includes a second washing cycle of the first-washed towels with a second aqueous wash solution at a second temperature. The second aqueous wash solution comprises a second wash composition comprising a surfactant, and a builder, at a second alkaline pH, and has a second wash temperature.

A time period for the second wash cycle can be the same or different from the time for the first wash cycle, and can be at least 5 minutes, and up to about 1 hour, or even longer. Non-limiting examples of the time period for the second wash cycle can include, at least 10 minutes, at least 15 minutes, at least 20 minutes, at least 25 minutes, and at least 30 minutes, and up to about 50 minutes, up to about 45 minutes; up to about 40 minutes, up to about 35 minutes, and up to about 30 minutes.

The second washing step can be omitted from the washing cycle. In some embodiments, a second washing step may not be used when the soil load may be light or the intensity or tenacity of the stains in the soiled towels are low. The second washing step is optional, though preferred, when washing towels with stubborn stains.

The surfactant can comprise any surfactant, and can be contained in an active level by weight of the second wash composition, as described herein above for the first wash solution or step.

The builder can comprise any builder, and can be contained in an active level by weight of the second wash composition, as described herein above for the first wash solution or step.

The pH of the second wash solution is typically higher than the pH of the first wash, in the range of pH 10-13. In various embodiments, the pH of the second wash solution can be as described herein above for the first washing solution.

The temperature of the second wash solution is typically higher than the temperature of the first wash solution. A typical second wash solution temperature is about 170-180 degree F. In one embodiment, the optional second aqueous wash solution has a pH of about 10.5, and a temperature of about 175 degrees F.

A soil release polymer is not typically used in the second wash solution. Besides, the higher temperature and higher pH of the second wash solution strips away most residual soil release polymer from the washed towels and into the wash solution.

After the optional second washing cycle, the residual wash solution is drained away, and one or more rinses of the second-wash towels is performed.

An optional, though often preferred, bleaching step includes a bleach cycle of the washed towels (first-washed towels or second-washed towels) with an aqueous bleach solution at a bleaching temperature. In various embodiments, a bleach cycle using a bleach solution is required and is not optional. The bleaching step is particularly used to brighten and whiten white fabric and towels loads, to improve odor, to provide antibacterial fabrics, and for hygienically laundering fabrics and towels.

The aqueous bleach composition comprising one or more bleach compound. A suitable bleach compound for use in the methods of the invention can be a halogen-based bleach or an oxygen-based bleach. A preferred halogen-based bleach is a hypochlorite bleach, desirably present at a concentration (as active halogen) in the aqueous bleach composition, in the range of from 0.1 to 10%, preferably from 0.5 to 8%, more preferably from 1 to 6%, by weight. As a halogen bleach, alkali metal hypochlorite may be used, such as sodium hypochlorite. Other suitable halogen bleaches are alkali metal salts of di- and tri-chloro and di- and tri-bromo cyanuric acids.

A suitable oxygen-based bleach is a peroxygen bleach, such as sodium perborate (tetra- or monohydrate), sodium percarbonate, hydrogen peroxide and a peracid (peroxyacid). These are preferably used in conjunction with a bleach activator which allows the liberation of active oxygen species at a lower temperature. Numerous examples of activators of this type, often also referred to as bleach precursors, are known in the art and amply described in the literature such as U.S. Pat. Nos. 3,332,882 and 4,128,494, herein incorporated by reference. Preferred bleach activators are tetraacetyl ethylenediamine (TAED), sodium nonanoyloxybenzene sulphonate (SNOBS), glucose pentaacetate (GPA), tetraacetylmethylene diamine (TAMD), triacetyl cyanurate, sodium sulphonyl ethyl carbonic acid ester, sodium acetyloxybenzene and the mono long-chain acyl tetraacetyl glucoses as disclosed in WO-91/10719, but other activators, such as choline sulphophenyl carbonate (CSPC), as disclosed in U.S. Pat. Nos. 4,751,015 and 4,818,426, herein incorporated by reference, can also be used.

A suitable bleaching temperature for the aqueous bleach solution can be within a range from 100-170 degree F., though more typically from 140-150 degree F., including about 145 degrees F., and typically not more than 155 degrees F. A range of 140-150 degree F. is typical for food-soiled cotton towels. Excessive bleaching temperature and a long bleaching wash times can cause damage to fabrics.

A time period for the bleach cycle can be the same or different from the time for the first or second wash cycle. In various embodiments, time period for the bleach cycle can be at least 5 minutes, and up to about 1 hour, or even longer. Non-limiting examples of the time period for the bleach cycle can include, at least 10 minutes, at least 15 minutes, at least 20 minutes, at least 25 minutes, and at least 30 minutes, and up to about 50 minutes, up to about 45 minutes; up to about 40 minutes, up to about 35 minutes, and up to about 30 minutes.

After the bleaching cycle, the residual bleach solution is drained away, and one or more rinses of the bleached towels is performed.

In various embodiments, a rinse following the bleaching cycle can include an antichlor, a substance used to decompose residual hypochloride or chlorine after chlorine-based bleaching, in order to prevent ongoing reactions with, and possible damage to, the fabrics that had been bleached. In various embodiments, the antichlor can be selected from the group consisting of a salt or thiosulfate, for example sodium thiosulfate, a bisulfite salt, for example, sodium and potassium bisulfite, or a metabisulfite salt, for example sodium metabisulfite, and hydrogen peroxide. In one embodiment, the antichlor is a thiosulfate salt. The antichlor can be added to the antichlor rinse solution as a concentrate or diluted powder or aqueous liquid.

A post-wash treatment step includes a treatment cycle of the bleached towels with a treatment solution at a treating temperature. The treatment solution comprises a non-durable soil release polymer agent in an amount sufficient to coat the polyester and cellulosic fibers and threads of the towels. The active level of the soil release polymer is preferably about 0.03% to 3.0% by weight of the dry towel-sized fabric units, and in a typical embodiment, about 0.1 to 0.6% by weight of the dry towel-sized fabric units. The treatment solution is formed by adding into water or aqueous solution an amount of a post-wash treatment composition comprising the soil release polymer. In various embodiments, the treatment solution can also comprise an acidic or acidic buffering agent to effect a reducing in the pH of the water or aqueous solution. In various embodiments, the soil release polymer can be supplied as a concentrated liquid as a solution or a dispersion, with an active polymer content of from about 2% to about 80%. A suitable soil release polymer agent provides protection from the redeposition of soils in the first and early wash cycles onto the fibers and fabric, including the polyester, nylon, and cellulosic fibers, of the stitchbonded washable towel. The soil release polymer included in the heated aqueous solution provides to the freshly-manufactured towel a resistance to redeposition of accumulated soils in the washing solution, typically from other soiled fabrics in a washing cycle, onto the stitchbonded towel, including onto the substantial amount of nylon and polyester stitching yarn in the washable towel.

Examples of suitable soil release polymers (SRP) agents are low molecular weight, hydrophilic polyester polymers. These types of compounds are used in the textile industry as semi-permanent soil release compounds on polyester fabrics, as oil scavengers in scouring and dyeing of synthetic fiber textile fabrics (especially polyester knits), and as softeners and lubricants for polyester textile fabrics. Such SRI agents are known to be used in laundry detergent formulations, where their effect in assisting soil removal is expected to build up slowly over repeated washings.

The pH of the treatment solution is typically acidic, which is typical of sour solution used after a chlorine bleaching cycle, and can be within the pH range of 4-7, and more particularly between about pH 5 and about pH 6. The lower acidic pH of the treatment cycle also aids in exhausting any remaining the soil release polymer onto the towels or fabrics. A suitable acidic agent is an organic acid agent in a concentrated or dilute powder or liquid form, and can include urea sulfate (monocarbamide dihydrogen sulfate) and other organic acid compounds, and mixtures thereof.

In an embodiment of the invention, the treatment solution has a temperature between about 125 and 200 degrees F. In various embodiments, the treatment solution has a temperature between about 140 and about 185 degrees F., and can include a temperature range of about 140-150 degrees F. and about 175 and 185 degrees F.

In an embodiment of the invention, the treatment solution has a temperature between about 175 and 185 degrees F. and a pH range of 5-6, to aid in exhausting soil release polymer from the treatment solution and onto the towels or fabrics.

In an embodiment of the invention, the temperature is lower than any temperature that might cause excessive shrinkage of a towel, and in particular a stitch-bonded towel having shrinkable threads and yarn.

In an embodiment wherein the towels are stitchbonded with a yarn, such as a partially-oriented nylon or polyester yarn, that is heat shrinkable, the treatment solution is held at a temperature less than a temperature at which the partially-oriented nylon and polyester yarn become fully fixed. Temperatures should be maintained below the pre-shrunk temperature of the stitch yarns.

A time period for the treatment cycle can be the same or different from the time for the first or second wash cycle or the bleach cycle, and can be at least 5 minutes, and up to about 1 hour, or even longer. Non-limiting examples of the time period for the treatment cycle can include: at least 10 minutes, at least 15 minutes, at least 20 minutes, at least 25 minutes, and at least 30 minutes, and up to about 50 minutes, up to about 45 minutes; up to about 40 minutes, up to about 35 minutes, and up to about 30 minutes.

In an optional further step, after the exposure of the fabrics to the treatment solution, the towels are drained and rinsed in one or more lower-temperature baths, to cool the treated towels to a suitable temperature for unloading of the laundry machine, and mitigating any creasing and wrinkling that may occur if the heated towels are left uncooled.

The SRP agents of the present invention can include nonionic soil release agents having oxyethylene hydrophiles, for example, the condensation polymers of polyethylene glycol and/or ethylene oxide addition products of acids, amines, phenols and alcohols which may be monofunctional or polyfunctional, together with binder molecules capable of reacting with the hydroxyl groups of compounds with a poly (oxyalkylene) chain, for example, organic acids and esters, isocyanates, compounds with N-methyl and N-methoxy groups, bisepoxides, etc. Particularly useful are the condensation products of dimethyl terephthalate, ethylene glycol and polyethylene glycol (ethoxylated polyester) and ethoxylated polyamides, especially ethoxylated polyesters and polyamides having a molecular weight of at least 500, as well as soil release agents described in the following patents, the disclosures of which are incorporated herein by reference: U.S. Pat. Nos. 3,416,952, 3,660,010, 3,676,052, 3,981,807, 3,625,754, 4,014,857, 4,207,071, 4,290,765, 4,068,035, 4,937,277, 6,200,351, 8,900,328, and 9,890,350. Combinations of anionic soil release agents with oxyethylene hydrophile condensates, such as are generally referred to as sulfonated ethoxylated polyesters and soil release agents are disclosed in the following patents: U.S. Pat. Nos. 3,649,165, 4,073,993, and 4,427,557, the disclosures of which are incorporated herein by reference. Additional hydrophilic treatments may be found in U.S. Pat. No. 7,012,033, incorporated herein by reference.

A non-limiting example of a soil release polymer is a polyester polymer (CAS Number 9016-88-0), available in a concentrated liquid as Pomoco 5962 from Piedmont Chemical Industries. This polymer has been found to be surprisingly effective in preventing re-deposition soiling, including on the cellulosic portions of the nonwoven washable towels of the invention, showing a significant improvement in the cleanliness, whiteness, and residual odor, when towels treated this way are laundered conventionally with cotton bar towels.

In another aspect of the invention, the use of the hydrophilic SRP agent in a pre-treatment of the washable towel, effects a surface on the polyester fibers and yarns that is more wettable by water, to improve the absorbency and wicking performance of the nonwoven washable towel is not impaired and is in some cases enhanced, relative to the washable towel without SRP agent treatment or conventional bar towels. When the pre-treated washable towel has been dried following the pre-treatment with SRP agent, the dried towel is softer and more flexible, and less paper-like, than conventional towels having comparable quantities and types of cellulosic fibers. In another embodiment of the method, a temperature of the heated aqueous solution containing the SRP agent is maintained in a range between about 175 and 185 degrees F., in order to partially fix a portion of the SRP agent in the heated aqueous solution to the fibers and yarns of the washable towel, where the affixed SRP agent remains through the rinse and drying cycles. The resulting washable towel is then used in ordinary cleaning duty, and when laundered for the first time with other soiled towels, the residual affixed SRP agent improves the release of accumulated soils and stains, and helps prevent re-deposition of soils and stains from the wash solution onto the cleaned, washable towel.

Without being bound by any particular theory, it is believed that the soil release polymer agent that is applied to the fabric in the pre-treating process allows the SRP agent to be retained sufficiently to the fabrics to serve as a barrier to staining under normal use. However, at the proper laundering conditions, including wash solution temperature and washing agents, the retained SRP agents can be substantially removed from the fabrics in the subsequent wash process, to assist in freeing soils from the towel surface and creating an enhanced cleaning effect under less rigorous washing conditions.

After the treatment cycle, the residual treatment solution is drained away, and one or more rinses of the treated towels is performed. After extracting residual water, the towels are remove from the laundry machine, and dried.

In an embodiment, the towels that had been soiled comprise a towel with a soil release polymer deposited onto the fibers and/or fabric of the towel. In a preferred embodiment, the towels consist of stitchbonded nonwoven towels that is treated with a soil release polymer after formation of the fabric and gathering the stitchbonding yarns of the fabric to form a rewashable towel.

As discussed above, use of SRPs is desirable for removal of certain soil types, particularly oily soils found in industrial laundry settings. The SRP can be useful in its direct treatment of soil on a textile and further can have a residual effect whereby preventing adherence of soils later. Thus, in certain contexts it may be beneficial for the SRP to remain on a textile when the laundering is completed. However, it has been found that when paired with typical industrial laundering methods, the SRI does not retain its effective properties as the alkalinity hydrolyzes the SRP. Thus, under traditional industrial laundering methods the SRP is often hydrolyzed and is not as effective at removing soils in the laundering method and/or does not remain on the fabric for the residual effect that can prevent oils from adhering to the fabric.

Between any of the wash steps and finishing steps there can be rinse steps. One or more rinse steps are preferred after the first and any second wash step, the bleaching step, and the antichlor and souring steps.

In industrial laundering processes and facilities, it is common to have numerous formulations and recipes for the laundering of different types of soiled fabrics. In such systems, it is common to add varying levels of the ingredients into the washing, rinsing or bleach solutions at the different wash steps. For example, rather than preparing a stock quantity of a first or second wash composition containing, for example, a builder, surfactant, alkaline ingredient, and optional bleach ingredient, and adding a fixed amount by weight or volume of the stock washing composition into the laundry machine, each of the builder, surfactant, alkaline ingredient, and optional bleach ingredient are separately added in a respective fixed amount by weight or volume into the laundry machine.

An ingredient dosing system can comprise a delivery pump and valves to select and direct a needed chemical active or ingredient from a chemical or ingredient storage area, to the laundry machine. Chemical active or ingredients are stored individually in a tank, a tote, or a drum, each container connected via a hose or pipe having an ingredient selection valve and connected to a manifold. The FIGURE illustrates an example of a laundry ingredient dosing system for delivering chemical agents or ingredients to a laundry machine. The FIGURE shows a series of six containers 10 for a chemical agent or ingredient. Fewer or more containers 10 can be used. Each container is configured to contain a pumpable liquid composition. Each container includes a discharge line 12 and a remotely or manually-controlled ingredient valve 14 connecting into a manifold 16, to allow flow or to shutoff flow of the liquid ingredient from the container 10 into the manifold 16. An inlet end 17 of the manifold 16 is in selective liquid communication with a water supply via a water flush valve 18, and an outlet end 19 of the manifold 16 inputs to a pump 20. The ingredient valves 14 are connected into the manifold 16 between the inlet end 17 and the outlet end 19. The pump 20 discharges into an inlet end 21 of a second delivery manifold 22. A plurality of delivery valves 24 and associated delivery lines 23 connect the delivery manifold 22 to a corresponding plurality of laundry machines 30, to allow flow or to shutoff flow of the liquid ingredients from the delivery manifold 22 to the laundry machines 30. The discharge line(s) 12, manifolds 16 and 22, and delivery lines 23 can include tubing or flexible hosing.

In various embodiments, the chemical dosing system can include a means for measuring and/or metering a volume or mass of any one chemical agent or ingredient from any one of the containers 10. FIG. 1 illustrates a flowmeter 26 for measuring the volume of a liquid discharged from the pump 20. In various embodiments, the containers 10 can be positioned on weigh cells to detect a change in the mass of liquid within the containers 10.

In various embodiments, the ingredient dosing system includes a control system that includes a computer with programming for controlling one or more, though preferably all of, the pump 20, the ingredient valves 14, the water flush valve 18, the delivery valves 24, and the laundry machines 30. The programming is configured to dispense a correct amount of any one chemical agent or ingredient for each wash process, formula, machine, and fabric loading weight combination. At an appropriate time, the programming calls for each required chemical agent or ingredient. Each laundry machine 30 is independently interfaced with the ingredient dosing system, so that, for example, when a first ingredient is to be added, a preprogrammed amount (a mass or volume) of a particular ingredient is pumped from a container 10 through discharge line 12 through an opened ingredient valve 14, and into the ingredient manifold 16 to the inlet end of the pump 20. The pump 20 discharges from the container 10 the required volume of mass of liquid ingredient into the delivery manifold 22, and through the respective delivery valve 24 to the target laundry machine 30. As appropriate, following the pumping of an ingredient or ingredients from a container 10 and the closing of the ingredient valve 14, a minimal quantity of water is passed through water flush valve 18 through the ingredient manifold 16, the pump 20, and delivery manifold 22, to flushed any residual ingredient amounts into the target laundry machine 30.

In various embodiments, the laundry machine 30 pauses or holds its washing action as the ingredient dosing and line flushing steps for any ingredient are made and completed, before proceeding in a run mode with the washing action. A dosing system can supply up to 10 to 16 washers, with up to 10 to 16 individual chemicals. In this way, any of a variety of wash classifications based on the soiled fabric (for example, mats, towels including bar towels, and garments) are laundered using a preprogrammed, appropriate wash process and chemical agent or ingredient dosing process.

In some laundering processes, and occasionally, a solid or powdered material, for example a dye pack, can be manually added by an operator through a hatch or door in the side or top of a laundry machine. In this case the laundering program can alert the operator and pause or hold a laundering cycle until the required solid or powdered material is added into the laundry machine, and the pause or hold is manually released.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

Embodiments of the present invention are further defined in the following non-limiting Examples. It should be understood that these Examples, while indicating certain embodiments of the invention, are given by way of illustration only.

EXAMPLES

All wash testing results on the soiled towels were prepared using a 30-pound capacity Milnor or Unimac pocket laundry machine, and a standard industrial dryer. The standard loading was 250 soiled towels weighing about 45 pounds, or about 150% of stated capacity. The main chemical components of the laundering system included alkaline (30% sodium hydroxide, a conventional builder, a conventional nonionic surfactant, hypochlorite bleach, a commercial-grade soil release polymer (CAS Number 9016-88-0, available in a concentrated liquid as Pomoco 5962 from Piedmont Chemical Industries), a conventional anti-chlor (to neutralize/decompose hypochlorite or chlorine bleach), and acid sour (to reduce pH in the final rinse). Table A below shows the concentration of the agents in various aqueous solutions used in the laundering tests for flushing, washing, rinsing, bleaching and post-treating, with the units of the components, in grams per 100 kilograms of soiled towels.

Correspondingly, Table B below shows the concentration of listed ingredients as a weight percentage of the wash solutions identified in Table A. It is noted that concentrations of the ingredients in Table B are based on an assumed soil factor of 2.2, which is a weight of the added water in the solution to the weight of the soiled fabrics, which includes both soil and water. The laundering cycles, the sour/AC1 cycles and the SRP treatment cycles can operate with a liquor ratio of about 3.5:1 (a high water fill setting), and the flush and bleaching cycles can operate with a liquor ratio of about 1.67:1 (a low water fill setting), where the liquor ratio is the weight of the added water in the solution to the weight of the soiled towels.

The towels used were white, stitchbonded nonwoven towels having a gathered nonwoven face sheet of a nonwoven layer of lyocell fibers, and a gathered nonwoven back sheet of an outer nonwoven layer of wood pulp fibers and an inner nonwoven layer of polyester fibers that are heavily hydroentangled with the wood pulp fibers of the outer nonwoven layer, with the inner nonwoven layer of polyester fibers confronting the gathered nonwoven face sheet of lyocell fibers. The gathered component sheets of the stitchbonded washable towel were integrated together with the multiplicity of stitching yarn comprising the face-bar yarn on the technical face and the back-bar yarn on the technical back, to fix and gather the nonwoven face sheet to the nonwoven back sheet.

Two versions of the stitchbonded nonwoven towels were used. A first version were stitchbonded nonwoven towels that were given a post-treatment, after the stitchbonding of the nonwoven layers, in an agitated, heated aqueous solution for a controlled amount of time to cause the stitching yarns to shrink to a desired extent and cause gathering of the fabrics into the stitchbonded washable towels. A second version were stitchbonded nonwoven towels that were given a modified post-treatment, where a hydrophilic soil release polymer (SRP) agent is added into the agitated, heated aqueous solution, to protect the freshly-manufactured towel from the re-deposition of soils in the first and early wash cycles onto the fibers and fabric of the stitchbonded washable towel.

Example 1—First Version Towels

Soiled first version towels were laundered according to the following steps:

(i) flushed with 100° F. flush water (FW1) for 5 minutes,
(ii) washed with 175° F. wash solution (Wash1) for 15 minutes;
(iii) rinsed three cycles of 150° F. water for 3 minutes, 150° F. water for 2 minutes, and 145° water for 2 minutes;
(iv) bleached with 145° F. bleach solution (Bleach1) for 10 minutes;
(v) rinsed three cycles with cold water for 2 minutes each;
(vi) treated with 100° F. sour and antichlor solution (Sour/AC1) for 4 minutes;
(vii) extracted (spin) for 5 minutes; and
(viii) dried.

This conventional wash cycle for soiled towels used a high alkaline wash formulation on non-treated, first version towels. The results were based on an average of four loads, and showed heavy soil redeposition, residual stains, and a remaining odor. The entire load was typically relaundered. These results show the effect of a lack of a SRP post-treatment on the as-manufactured white, stitchbonded nonwoven towels that included polyester fibers.

Example 2—Mixture of First Version and Second Version Towels

A mixture of soiled first version towels and soiled second version towels were laundered according to the same steps as Example 1.

This conventional wash cycle for soiled towels used a high alkaline wash formulation, on a mixture of non-treated first version towels and SRP-treated second version towels. The results were based on an average of eight loads. The non-treated first version towels showed heavy soil redeposition, residual stains, and a remaining odor. The SRP-treated second version towels showed substantial removal of the SRP pre-treatment, and subsequent soiling and laundering showed progressively increased staining, darkening in color, and increased odor. These results shows the effect of both a lack of a SRP post-treatment on the as-manufactured white, stitchbonded nonwoven towels that included polyester fibers, and a benefit of a SRP post-treatment on the as-manufactured white, stitchbonded nonwoven towels that included polyester fibers.

Example 3—Second Version Towels

Soiled second version towels were laundered according to the following steps:

(i) washed with 175° F. wash solution (Wash2) for 20 minutes;
(ii) rinsed two cycles of 150° F. water for 3 minutes, and 150° F. water for 2 minutes,
(iii) bleached with 145° F. bleach solution (Bleach2) for 15 minutes;
(iv) rinsed three cycles with cold water for 2 minutes each,
(v) treated with 100° F. sour and antichlor solution (Sour/AC1) for 4 minutes;
(vi) extracted (spin) for 5 minutes; and
(vii) dried.

This was a wash cycle for soiled, SRP-treated second-version towels, using a low alkaline wash formulation that contained soil release polymers to combat soil redeposition, as high alkalinity reduced the effectiveness of SRPs. The results were based on an average of four loads. However, the low alkalinity of the wash solution resulted in over 10% of the towels being rejected for stains of the type against which high alkaline would be effective, and odor.

Example 4—Second Version Towels

Soiled second version towels were laundered according to the following steps:

(i) washed with 175° F. wash solution (Wash2) for 15 minutes;
(ii) second washed with 175° F. wash solution (Wash1) for 15 minutes;
(iii) rinsed three cycles of 150° F. water for 3 minutes, 150° F. water for 2 minutes, and 145° F. water for 2 minutes,
(iv) bleached with 145° F. bleach solution (Bleach1) for 10 minutes,
(v) rinsed three cycles with cold water for 2 minutes each,
(vi) treated with 100° F. sour and antichlor solution (Sour/AC1) for 4 minutes;
(vii) extracted (spin) for 5 minutes; and
(viii) dried.

This was a two-stage wash cycle for soiled, SRP-treated second-version towels, using a first-stage low alkaline wash formulation that contained soil release polymers to combat soil redeposition, and a second-stage very high alkalinity (pH 13) wash formulation for improved stain removal. The results were based on an average of four loads. The two-stage washing resulted in reduced chemical usage, and shorter overall load completion time. An average of only 1% of the towels were rejected for stains, with low odor. No post-treatment with SRP was used to replace the polymer removed in the high alkalinity washing.

Example 5—Second Version Towels

Soiled second version towels were laundered according to the following steps:

(i) flushed with 100° F. flush water (FW2) for 4 minutes;
(ii) washed with 145° F. wash solution (Wash 3) for 8 minutes;
(iii) second washed with 175° F. wash solution (Wash4) for 7 minutes
(iv) rinsed two cycles of 150° F. water for 2 minutes each;
(v) bleached with 145° F. bleach solution (Bleach3) for 10 minutes;
(vi) rinsed one cycle of 145° F. water for 2 minutes with cold water for 2 minutes each;
(vii) treated with 145° F. sour and antichlor solution (Sour/AC1) for 2 minutes;
(viii) treated with 175° F. SRP solution (Treat1) for 10 minutes;
(ix) rinsed one cycle of 100° F. water for 4 minutes;
(x) extracted (spin) for 5 minutes; and
(xi) dried.

This was a two-stage wash cycle for soiled, SRP-treated second-version towels, using a first-stage low alkaline wash formulation that contained soil release polymers to combat soil redeposition, and a second-stage high alkalinity (pH 11) wash formulation for improved stain removal. The results were based on an average of twelve loads. The two-stage washing resulted in reduced chemical usage, especially of alkali, and shorter overall load completion time. A post-treatment with SRP replaced the polymer that was removed in the second-stage high alkalinity wash step. An average of only 1.9% of the towels were rejected for stains. The effective cleaning of towels maintained over many wash cycles.

Example 6—Second Version Towels

Soiled second version towels were laundered according to the following steps (i) flushed with 100° F. flush water (FW3) for 4 minutes;
(ii) washed with 145° F. wash solution (Wash 5A) for 7 minutes;
(iii) added alkali to wash solution of step (ii) to form second wash solution (Wash5B), and increased temperature;
(iv) continued wash with 175° F. second washed (Wash5B) for 8 minutes;
(iv) rinsed two cycles of 150° F. water for 2 minutes each;
(v) bleached with 145° F. bleach solution (Bleach3) for 10 minutes;
(vi) rinsed one cycle of 145° F. water for 2 minutes;
(vii) treated with 145° F. sour and antichlor solution (Sour/AC1) for 2 minutes;
(viii) treated with 175° F. SRP solution (Treat1) for 10 minutes;
(ix) rinsed one cycle of 100° F. water for 4 minutes;
(x) extracted (spin) for 5 minutes; and
(xi) dried.

This was a two-phase, single wash cycle for soiled, SRP-treated second-version towels, using a first-phase low alkaline wash formulation that contained soil release polymers to combat soil redeposition, with the addition of alkali part-way through the wash cycle, that raised alkalinity, and with increased temperature, in a second-phase high (pH 11) alkalinity wash formulation for improved stain removal. The results were based on an average of four loads. A post-treatment with SRP replaced the SRP polymer that is removed in the second-stage high alkalinity wash step.

Example 7—First Version Towels

Soiled first version towels are laundered according to the following steps:

i) flush with 100° F. flush water (FW2) for 4 minutes,
(ii) wash with 145° F. wash solution (Wash 3) for 8 minutes,
(iii) second wash with 175° F. wash solution (Wash4) for 7 minutes,
(iv) rinse two cycles of 150° F. water for 2 minutes each;
(v) bleach with 145° F. bleach solution (Bleach3) for 10 minutes;
(vi) rinse one cycle of 145° F. water for 2 minutes with cold water for 2 minutes each;
(vii) treat with 145° F. sour and antichlor solution (Sour/AC1) for 2 minutes;
(viii) treat with 175° F. SRP solution (Treat1) for 10 minutes;
(ix) rinse one cycle of 100° F. water for 4 minutes;
(x) extract (spin) for 5 minutes; and
(xi) dry.

This is a two-stage wash cycle for soiled, SRP-treated second-version towels, using a first-stage low alkaline wash formulation that contains soil release polymers to combat soil redeposition, and a second-stage high alkalinity (pH 11) wash formulation for improved stain removal. A post-treatment with SRP places the polymer onto the fabric of towel.

Example 8—Second Version Towels

Soiled second version towels are washed according to the following steps i) flush with 100° F. flush water (FW2) for 4 minutes;
(ii) wash with 175° F. wash solution (Wash 6) for 15 minutes;
(iii) rinse three cycles of 140-160° F. water for 2 minutes each;
(iv) bleach with 150° bleach solution (Bleach4A) for 3 minutes;
(v) added additional bleach agent to the bleach solution of step (iv) to form second bleach solution (Bleach4B);
(iv) continued bleach with 150° F. second bleach solution (Bleach4B) for 7 minutes;
(vi) rinse one cycle of 140-160° F. water for 2 minutes;
(vii) treat with 140-160° F. sour and antichlor solution (Sour/AC1) for 3 minutes;
(viii) treat with 145° F. SRP solution (Treat1) for 5 minutes
(ix) rinse one cycle of 75° F. water for 2 minutes;
(x) extract (spin) for 5 minutes; and
(xi) dry.

This is a one-stage wash cycle for soiled, two-phase bleach cycle with second-version towels. A post-treatment with SRP places the polymer onto the fabric of towel.

It is intended that the scope of the present invention include all modifications that incorporate its principal design features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art from the foregoing description of the preferred embodiments without departing from the spirit or scope of the present invention.

TABLE A

| Grams Active per 100 kilograms of soiled towels | | | | | | | | |
|---|---|---|---|---|---|---|---|---|
| Solution | pH | NaOH (as 30% sol'n) | Builder | Nonionic surfactant | Hypo-chlorite bleach | SRP | Anti-chlor | Acid sour |
| FW1 | 9 ± 0.5 | 675 | | | | | | |
| FW2 | 9 ± 0.5 | | 375 | | | | | |
| FW3 | 9 ± 0.5 | 150 | | | | | | |
| Wash1 | 13 ± 0.5 | 5400 | 975 | 615 | | | | |
| Wash2 | 8.5 ± 0.5 | | 1530 | 510 | | 2000 | | |
| Wash3 | 8.5 ± 0.5 | | 565 | 385 | | 1000 | | |
| Wash4 | 11 ± 0.5 | 2500 | 500 | 150 | | | | |
| Wash5 | 8.5 ± 0.5 | | 565 | 450 | | 1000 | | |
| Wash5B | 11 ± 0.5 | 2000 | | | | | | |
| Wash6 | 12.5 ± 1.0 | 5500 | 950 | 500 | | 1000 | | |
| Bleach1 | 11 ± 0.5 | | | | 2340 | | | |
| Bleach2 | 11 ± 0.5 | | | | 2750 | | | |
| Bleach3 | 11 ± 0.5 | | | | 2400 | | | |
| Bleach4A | 10.5 ± 1.0 | | | | 2000 | | | |
| Bleach4B | 10.5 ± 1.0 | | | | 1000 | | | |
| Sour/AC1 | 6.5 ± 0.5 | | | | | | 200 | 200 |
| Treat1 | 6.5 ± 1.0 | | | | | 1000 | | |

TABLE B

| Concentration Ingredients as weight % of laundering solution | | | | | | | | |
|---|---|---|---|---|---|---|---|---|
| Solution | pH | NaOH (as 30% sol'n) | Builder | Nonionic surfactant | Hypo-chlorite bleach | SRP | Anti-chlor | Acid sour |
| FW1 | 9 ± 0.5 | 0.148 | | | | | | |
| FW2 | 9 ± 0.5 | | 0.082 | | | | | |
| FW3 | 9 ± 0.5 | 0.033 | | | | | | |
| Wash1 | 13 ± 0.5 | 1.188 | 0.214 | 0.135 | | | | |
| Wash2 | 8.5 ± 0 5 | | 0.336 | 0.112 | | 0.440 | | |
| Wash3 | 8.5 ± 0.5 | | 0.125 | 0.084 | | 0.220 | | |
| Wash4 | 11 ± 0.5 | 0.550 | 0.109 | 0.032 | | | | |
| Wash5 | 8.5 ± 0.5 | | 0.125 | 0.099 | | 0.220 | | |
| Wash5B | 11 ± 0.5 | 0.440 | | | | | | |
| Wash6 | 12.5 ± 1.0 | 1.210 | 0.209 | 0.11 | | 0.220 | | |
| Bleach1 | 11 ± 0.5 | | | | 0.515 | | | |
| Bleach2 | 11 ± 0.5 | | | | 0.605 | | | |
| Bleach3 | 11 ± 0.5 | | | | 0.527 | | | |
| Bleach4A | 10.5 ± 1.0 | | | | 0.440 | | | |
| Bleach4B | 10.5 ± 1.0 | | | | 0.219 | | | |
| Sour/AC1 | 6.5 ± 0.5 | | | | | | 0.045 | 0.045 |
| Treat1 | 6.5 ± 1.0 | | | | | 0.219 | | |

We claim:

1. A method of laundering soiled textile items, the method comprising the steps of:

a) optionally flushing the soiled textile items with an alkali water solution for a time sufficient to loosen particulate soil on the fabric of the soiled textile items;

b) washing in a first phase of a wash cycle the soiled textile items in a first aqueous wash solution formed from a first wash composition, the first wash composition comprising a surfactant, a builder, an alkalinity source, and a soil release polymer, the first aqueous wash solution having a first alkaline pH, and a first wash temperature;

c) adding to the first wash composition a second alkalinity source, to form a second aqueous wash solution having a second alkaline pH higher than the first alkaline pH;

d) washing in a second phase of the wash cycle the first-phase washed textile items in the second aqueous wash solution at a second wash temperature;

e) optionally washing in a bleaching cycle the two-phase washed textile items in an aqueous bleach solution formed from a bleaching composition, the bleaching composition comprising one or more bleach compound, the bleach compound selected from the group consisting of a halogen-based bleach, an oxygen-based bleach, and a combination thereof, the bleach solution having a bleaching temperature; and f) treating in a post-wash treatment cycle the two-phase washed textile items, or the optional bleached textile items, in a treatment solution formed from a post-wash treatment composition, the post-wash treatment composition comprising a soil release polymer agent, at an active level of about 0.03% to 3.0% by weight of the dry textile items, and at a treatment solution temperature between about 125 and 200 degrees F.

2. The method of claim 1, wherein the alkali water solution has a pH between about 9.5 and 10.5.

3. The method of claim 2, wherein the first-phase wash cycle washes the soiled textile items for a time sufficient to remove soil on the textile items without redeposition of the soil back onto the textile items or into the laundry machine once the residual wash solution is drained.

4. The method of claim 1, wherein the first alkaline pH is in a range of about 8 and 10, and the first wash temperature is in a range from about 125 to 155 degree F.

5. The method of claim 4, wherein the second alkaline pH is in a range of about 10 and 11, and the second wash temperature is in a range from about 170 to 180 degree F.

6. The method of claim 5, wherein the treatment solution has a temperature in a range from about 175 to 185 degrees F., and a pH in a range of about 5 to 6, to aid in exhausting soil release polymer from the treatment solution and onto the textile items.

7. The method of claim 6, wherein the soiled textile items are soiled stitchbonded nonwoven towels.

8. The method of claim 1 that includes the washing in the bleaching cycle.

9. The method of claim 4 that includes the washing in the bleaching cycle.

10. The method of claim 9, wherein the treatment solution has a temperature in a range from about 175 to 185 degrees F., and a pH in a range of about 5 to 6, to aid in exhausting soil release polymer from the treatment solution and onto the textile items.

11. The method of claim 10, wherein the soiled textile items are soiled stitchbonded nonwoven towels.

12. The method of claim 5 that includes the washing in the bleaching cycle.

13. The method of claim 12, wherein the treatment solution has a temperature in a range from about 175 to 185 degrees F., and a pH in a range of about 5 to 6, to aid in exhausting soil release polymer from the treatment solution and onto the textile items.

14. The method of claim 13, wherein the soiled textile items are soiled stitchbonded nonwoven towels.

* * * * *